Oct. 30, 1956 B. COOPER ET AL 2,768,691
REPRODUCING PUNCH
Filed May 23, 1952 5 Sheets-Sheet 1

INVENTOR.
BENJAMIN COOPER
LINCOLN M. KEEFE
BY
ATTORNEY.

Oct. 30, 1956  B. COOPER ET AL  2,768,691
REPRODUCING PUNCH

Filed May 23, 1952  5 Sheets-Sheet 2

INVENTOR.
BENJAMIN COOPER
LINCOLN M. KEEFE
BY
J. B. Felshin
ATTORNEY.

Oct. 30, 1956  B. COOPER ET AL  2,768,691
REPRODUCING PUNCH

Filed May 23, 1952  5 Sheets-Sheet 3

INVENTOR.
BENJAMIN COOPER
LINCOLN M. KEEFE
BY
ATTORNEY.

Oct. 30, 1956  B. COOPER ET AL  2,768,691
REPRODUCING PUNCH

Filed May 23, 1952  5 Sheets-Sheet 4

INVENTOR.
BENJAMIN COOPER
LINCOLN M. KEEFE
BY
ATTORNEY.

Oct. 30, 1956   B. COOPER ET AL   2,768,691
REPRODUCING PUNCH
Filed May 23, 1952   5 Sheets-Sheet 5

INVENTOR.
BENJAMIN COOPER
BY LINCOLN M. KEEFE

ATTORNEY.

United States Patent Office 2,768,691
Patented Oct. 30, 1956

2,768,691

REPRODUCING PUNCH

Benjamin Cooper, New York, and Lincoln M. Keefe, Woodside, N. Y.; said Keefe assignor to said Cooper Application May 23, 1952, Serial No. 289,642

13 Claims. (Cl. 164—112)

This invention relates generally to reproducing punch machines and in particular, to a reproducing punch that automatically transfers codal data from a master card on to a detail card and concurrently perforates the detail card with manually preselectable data.

The present invention is particularly adaptable to toll checking systems of the type wherein interchange stations are located at each entry and exit point of a toll turnpike or thruway. Vehicles, upon entering the toll facilities are issued a ticket identifying the point of entry along with other pertinent data. Upon leaving the toll facility at a remote point, the ticket is presented to personnel on duty at the exit interchange. Upon receiving the surrendered ticket, the collector ascertains the rate of toll that is to be charged in accordance with the distance travelled and makes the required collection. It is proposed in such a system to issue credit cards or permit cards wherein an identification card is issued to a vehicle driver for use with a specific vehicle for passage on the toll facilities.

The present invention provides means whereby accurate recording is maintained of permit or charge account users with a minimum time delay for each transaction.

The present invention further provides a system whereby each credit or permit card in addition to bearing indicia that identifies the holder of the respective card, has perforated therein, a pattern of apertures that codally represents the account number of the permit or charge account holder. The instant invention is arranged to receive this perforated card and automatically transfer the perforated pattern therein into a toll rate ticket or detail card that is handed to the vehicle driver upon his entering the toll facility.

Further, the present invention provides means whereby additional information may be printed on the ticket or detail card along with further codally perforated data pertinent to the toll transaction. This data may be in the form of identification of the vehicle or classification of the vehicle. It may be pointed out at this time that vehicles are generally grouped into several classifications to facilitate the determination of toll rates, i. e., a passenger automobile would fall within one classification while a commercial truck may be in another and an omnibus may be in a third classification. The classification rate applicable to a vehicle times the distance travelled determines the toll rate that is to be charged. To prevent surreptitious practices between dishonest toll collectors or drivers, it is proposed that the vehicle be positively identified on the ticket or detail card that is handed to the collector.

Furthermore, the present invention provides means whereby the toll collector to whom the ticket was surrendered may perforate the rate of toll charged and other pertinent data into the detail card and retain said card as evidence of such collection. Subsequent tabulation by conventional punch card machines in a central accounting office provides an accurate record of each transaction. This is especially important in the event of a charge account transaction wherein future billing is necessary to collect the tolls that are charged against an account.

The instant device generally comprises a reciprocable gang punch having plural rows of individually operable punch pins. The rows of pins are divided into groups for their own respective purposes. The first group is controlled by the perforated permit or charge account card which may be in the form of a wallet sized card having credit identification printed thereon, and, of course, further provided with the aforesaid codal perforations.

The second group of punch pins is controlled by manual means to set up a desired perforation pattern which is codally representative of pertinent data. The credit or charge account card is hereinafter referred to as the "master" card while the toll rate card that is issued to the vehicle driver is hereinafter referred to as a detail card. A detailed card disposable within said device, is adapted to actuate trigger means which results in the perforation therein of the codal data identifying the credit account or permit identification number and the manually selected pertinent data.

Further, the detail card may be provided with a detachable section on which data may be printed corresponding to the manually selected pertinent codal data. Upon withdrawal of said detail card from the device, the printed section may be manually detached and returned to the customer as a receipt of the toll transaction, while the main portion of the card having the perforated data therein is retained and forwarded to central accounting. Punch card tabulating machines may be then utilized to tabulate the codally perforated information for accounting purposes. Such punch card tabulating machines are well known to those skilled in the art and form no part of the present invention.

Therefore, one of the principal objects of the present invention resides in a provision of means for automatically transferring codal data from a master card on to a detail card.

Another object of the invention is to provide manually presettable means selectively operable to simultaneously perforate preselected codal data in said detail card.

A further object of the invention is to provide printing means controlled by said manually presettable means operable in conjunction with the setting up of selectable perforating mechanism.

Yet another object of the present invention resides in the provision of control means for pre-setting said selectable perforating means.

Another object of the invention resides in the provision of means to automatically operate the perforating means upon the insertion of a detail card in its respective chamber.

And yet another object is to provide in a device of the character described sensing means that directly controls the perforating means.

Still another object is to provide control means whereby said perforating means will perforate a detail card but once with each insertion thereof in said chamber.

And another object resides in the provision of means for accurately locating the respective master and detail cards in their respective chambers before the initiation of perforating operation.

And still another object of the invention is to provide a device of the character described that is compact, simple and efficient in operation.

Other ancillary objects will be in part hereinafter apparent and in part hereinafter pointed out.

Referring to the drawings in detail, 10 generally designates a validating punch having a punch mechanism 12, manual control mechanism 14, printing mechanism 16 and drive shaft mechanism 18.

Punch mechanism 12 comprises a frame 20 having a horizontal base 22 in which vertical corner frame posts 24 are secured at their lower ends. Each pair of corner posts 24 are bridged at their upper ends by a transverse bar 26 and are secured thereto, as by screws 28. Slidably mounted on corner posts 24 and arranged for reciprocable movement, is a punch pin cage 30 comprising four bearing sleeves 32 interconnected at their respective ends to a pair of parallel spaced perforated plates 34. Sleeves 32 are cut away at 36 to expose corner posts 24. Laterally extending between each of the pairs of corner posts 24 and secured to the exposed portions thereof, are complemental slide supporting bars 38 and 38a. Bars 38 and 38a are provided for a purpose hereinafter appearing.

Disposed underneath pin cage 30 is a punch pin support plate 40. Plate 40 is provided with plural apertures 42, each being arranged to receive a corner post 24 therein. Pins 44 secure plate 40 to said corner post in fixed relation. Plate 40 is further provided with plural rows of aligned apertures 46, each arranged to receive punch pins 48 therein.

Disposed beneath plate 40 and arranged for reciprocal movement is a die 50 formed to provide a card receiving chamber 52 and perforated with plural rows of apertures 54. Apertures 54 are aligned with punch pins 48 which may enter therein, as will hereinafter be apparent.

Die 50 comprises a stripper plate 56 and a pressure plate 58 with the card-receiving chamber formed therebetween.

It may be pointed out at this time that cage 30 and die 50 reciprocate to and from the punch pin support plate 40 and are driven by means hereinafter described.

Pin cage 30 is provided with a plurality of pins 60 and a plurality of pins 62. Each pin 62, Figs. 1 and 7, preferably formed by sheet metal stamping or the like, has a central rectangular body portion 62a and reduced diametrical end portions 62b and 62c. End portion 62b of each pin 62 resides in an aperture 64 perforated in lower cage plate 34. The apertures 64 are disposed in alignment with the punch pins 48. The other end portion 62c of each pin 62 is slidably positioned within a corresponding aperture 66 perforated in upper cage plate 34. Circumjacently disposed on each pin portion 62b is a coil spring 68 which urges the respective pin 62 downwardly whereby body portion 62a abuts against lower cage plate 34. The lowermost ends of pins 62 are arranged to enter co-aligning apertures 70 in plate 72 of master card chamber 74 when cage 30 descends. However, with cage 30 in its uppermost or normal position, the ends of pins 62 are adjacent to but not within apertures 70 in plate 72. Lower plate 76 of the master card receiving chamber 74, is analogously perforated with coaligning apertures 70. Thus, the presence of a master card 78 in chamber 74 effectively controls the displacement or passage of pins 62 through the coaligning apertures 70 in the respective plates 70 and 76. When pin cage 30 moves downwardly, pins 62 sense the perforations in master card 78 and those pins finding perforations pass therethrough. The remainder of the pins yield against the tension of springs 68 and cannot move further with the descending cage.

Figure 1:
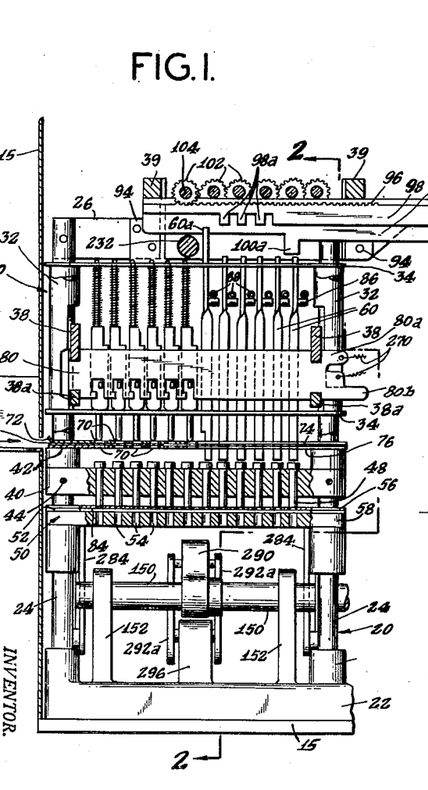
Fig. 1 is a front elevation of the punching mechanism in non-punching relation with fragmentary portions shown in cross section to more fully illustrate the structure thereof.
Figure 6:
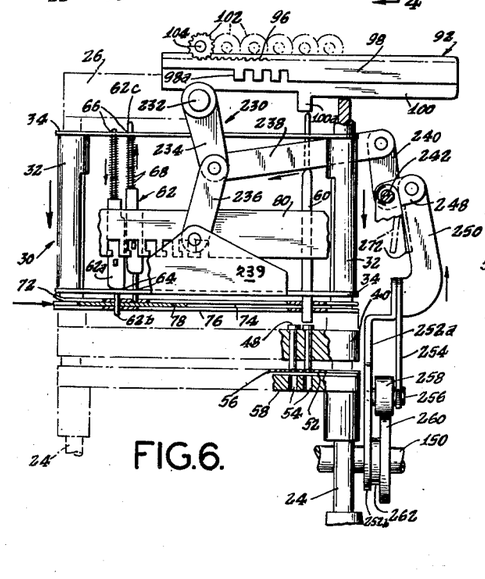
Fig. 6 is a fragmentary front elevation of the pin cage reciprocating mechanism further illustrating one pin in depressed condition and a manually settable rack in position to actuate a punch pin of each group.
Figure 7:
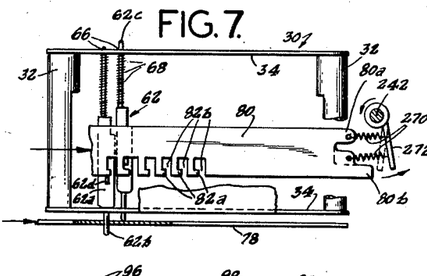
Fig. 7 is a fragmentary front elevation of a pin locking slide disposed in locking relation.
Figures 8, 8A:
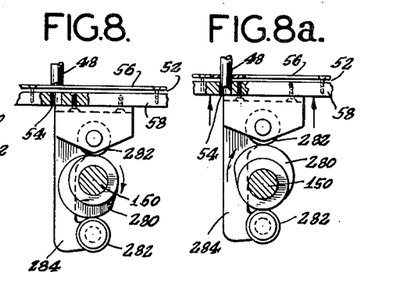
Fig. 8 is a fragmentary view of the lower die cam controlling mechanism in its lower-most non-punching position.
Fig. 8a illustrates the mechanism of Fig. 8 in its uppermost or punching position.
Figures 9, 10:
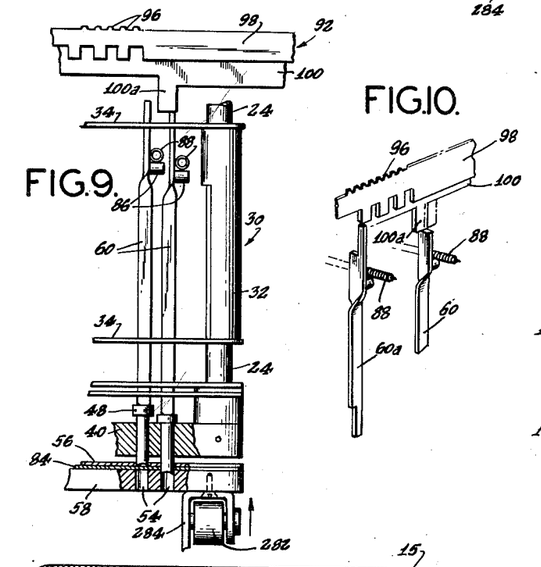
Fig. 9 is a fragmentary view illustrating the manually settable punch pin controlling means in punching position with one pin adjacent thereto in non-punching position.
Fig. 10 is a fragmentary isometric projection of the control hole actuating rack along with a selective punch pin.

Each of the pins 62 has a protrusion 62d outwardly extending therefrom, Figs. 1, 6 and 7, arranged for cooperation with a slide bar 80 to lock those pins that pass through perforations in master card 78 in rigid relation with the descending cage. Slide bars 80 are mounted in complemental slots formed in slide supporting bars 38 and 38a and are adapted for limited sliding movement therein. Further, each slide bar has recessed therein, a plurality of windows 82, one being provided for each pin 62, i. e., six pins 62 are shown in the present embodiment in each row of the groups of pins, therefore, six windows 82 are provided in each slide bar.

Obviously, the present invention is not limited to a specific number of pins, and greater amounts will readily operate in the same manner. Windows 82 are each formed with a lip 82a and an unrestricted channel 82b. Pin protrusions 62 normally reside in windows 82 and when cage 30 descends, protrusions 62d of those pins that enter perforations in master card 78 pass through the unrestricted channel portion 82b of window 82. The protrusions 62d of those pins that engage card 78 and yield thereagainst, remain in windows 82. Thus, rightward movement of slide bars 80 by means hereinafter described, positions lip 82a over protrusions 62d of those pins that descended with cage 30, thus locking said pins in fixed relation with cage 30, as is particularly well shown in Fig. 7.

Figure 2:
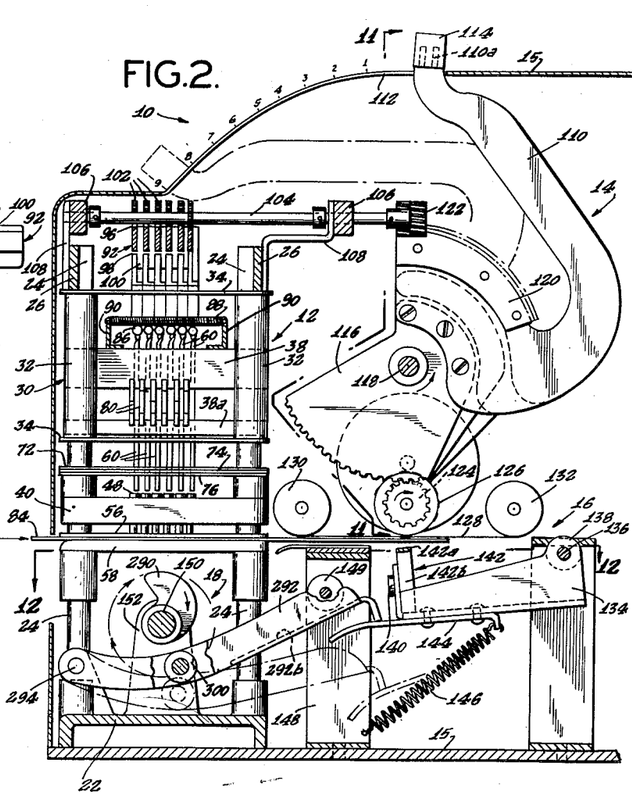
Fig. 2 is a cross section taken along line 2—2 of Fig. 1 further illustrating the manually operable means for jointly setting the selective punch pins and printing means.
Figure 3:
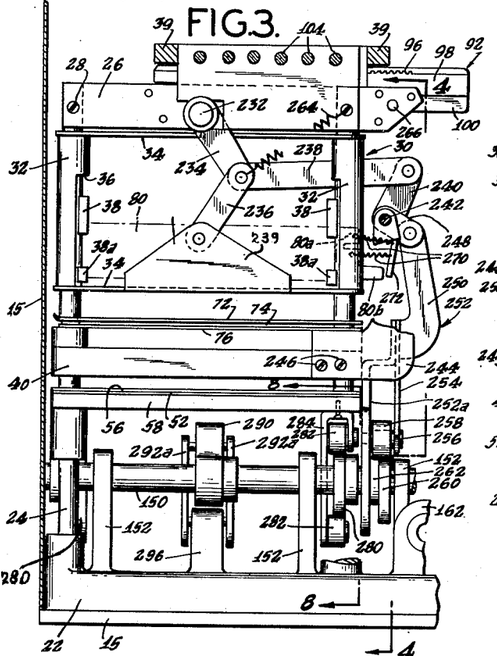
Fig. 3 is a front elevation of the sensing cage mechanism illustrating the reciprocating means and cam controls therefor.
Figure 4:
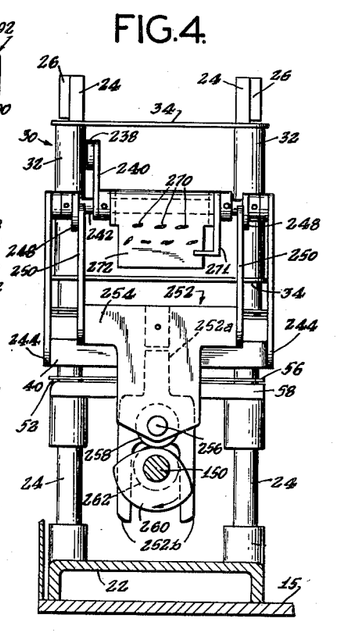
Fig. 4 is a cross section taken along the line 4—4 of Fig. 3.
Figure 5:
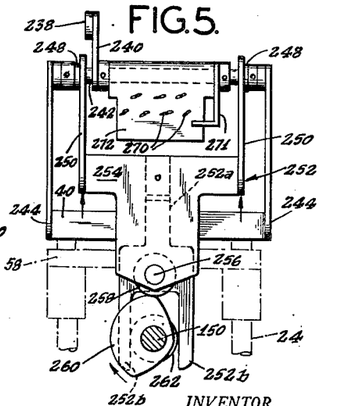
Fig. 5 is a fragmentary side elevation of the pin cage reciprocating means with the controlling cam illustrated in effective position whereby the cage is disposed in card sensing position.

Pins 60 are mounted in a similar arrangement in cage 30 to that of the pins 62. Pins 60 are likewise disposed in plural rows of six pins but, however, substantially longer than pins 62. It may be stated at this time, that the present arrangement of pins 60 and 62 is applicable to the well known Powers method of statistical coding. Accordingly, one of the pins 60, designated as 60a is relatively longer than the remaining pins 60. Pin 60a is provided as the control pin and cooperates with other predetermined pins 60 to effect control of punches 48 to perforate codal apertures representative of even numbers in detail card 84. The specific code is well known to those skilled in the art and need not be described in detail herein. Pins 60 are substantially rectangular in shape and are formed with an angular twist at approximately three quarters of their length. Each pin 60 is further provided with a protrusion 86 that extends transversely of the axis thereof. As shown in Fig. 2, a spring 88 mounted on suitable brackets 90 affixed to slide supporting bars 38 is tensioned over each row of protrusions 86. Springs 88 are provided for a purpose hereinafter appearing.

Pins 60 are slidably mounted in suitable apertures provided in upper and lower plates 34 of cage 30. The lowermost ends of pins 60 are arranged to abut against their respective coaligned punches 48. Accordingly, when cage 30 descends, pins 60 remain stationary yielding against the punches 40 while the cage moves downwardly. Ascension of the die 50, by means hereinafter described urges detail card 84 into engagement with the punches 48 and moves said punches upwardly. The upward movement of punches 48, carries the pin 60 therewith.

Selective means are provided to prevent the upward movement of desired pins 60, thereby locking the corresponding punches 48 against movement by the detail card 84 and effectively perforating said card. To this end there are provided a plurality of slide bars 92 having coded notches therein. Slide bars 92 are slidably supported in slots provided in brackets 94 affixed to cross bars 26. There is one slide bar 92 provided for each row of pins 60. As shown in Figs. 1, 2, 9 and 10, each slide bar 92 is formed with a serrated rack portion 96, a notched portion 98 and a second notched portion 100. The teeth on rack portion 96 are disposed in engagement with a pinion 102 fast on a shaft 104 journalled in bearings 106 supported by brackets 108, affixed to cross bars 26. Each slide bar rack 96 is controlled by a respective pinion 102 on a respective shaft 104. Shafts 104 are rotated by means hereinafter described. Thus, rotation of pinions 102 effectively moves the respective slide bars 92 and the notched portions 98 and 100 relative to the pins 60. Therefore, with notch 100a of slide bar portion 100 disposed over a respective pin 60, Figs. 9 and 10, said pin will not be displaced upwardly by its respective punch 48 when so urged by the detail card-carrying die 50. The restrained punch 48 then perforates an aperture in detail card 84. Analogously, one of the notches 98a, when disposed over the control pin 62a, effectively retains its punch 48 against movement and results in the perforation of a control aperture in the same row in detail card 84.

It will be apparent that those pins 60 displaced upwardly by detail card 84, further tension the respective springs 88 so that upon subsequent release of the card applied pressure on said pins, said pins will be returned by the springs 88 to their initial or normal positions.

It will be noted that transverse rods 39 are disposed laterally across the slide bars 92 in order to structurally reinforce said slide bars 92 against the pressure of pins 60 during punching operations.

Figure 11:
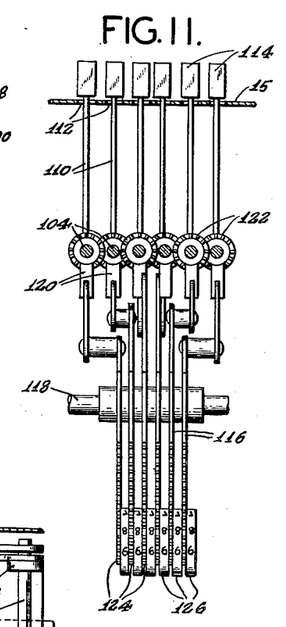
Fig. 11 is a front elevation of the lever actuated printing mechanism.

Means are provided to rotate pinions 102 and control the setting of slide bar notched portions as desired. To this end there is provided a plurality of manually operated levers 110 each having an end portion 110a which extends through slots 112 provided in case 15. End portions 110a are arranged to receive thereon, knobs 114 to facilitate manual operation of the levers. Levers 110, Figs. 2 and 11, are affixed to a respective rotatable segment 116 which is journalled on a shaft 118 secured in suitable bearing supports, not shown. Also affixed to each lever 110 is a segment gear 120 arranged to travel through a radial arc relative to the axis of shaft 118. The teeth of segment gear 120 are disposed in meshing engagement with a gear 122 affixed to a respective shaft 104 and operates in the well known worm-worm wheel manner. Therefore, manual movement of lever 110 from the position shown in solid line, Fig. 2, to the position shown in dotted line, rotates shaft 104 through a sufficient degree to enable pinion 102 to move its gear slide 92 from a minimum position to maximum position. The case 15 has graduated indicia thereon representative of the required lever position to perforate codal data corresponding to the indicia.

Levers 110 simultaneously control printing means that indicates and records the selected indicia. Gear segment 116 has the periphery, thereof serrated to engage respective pinions 124 coaxially secured to a print wheel 126. Print wheel 126 is provided with raised indicia corresponding to the aforesaid indicia on case 15. Thus, in addition to preparing pins 60 to perforate codal data representative of the selected data, levers 110 control print wheels 124 to position for printing the selected data.

Detail card 84 is disposed within die chamber 52 in such a manner as to extend under print wheels 126. Interposed between print wheels 126 and detail card 84 is an inked ribbon 128. The ribbon winding mechanism is conventional and is not shown in detail. It is sufficient to state that an inked ribbon is fed from a supply spool 130 on to a take-up spool 132 and vice versa.

Hammer means are provided to transfer the indicia from print wheels 126 on to the card 84. To this end there is provided a U-shaped hammer 134, Fig. 12, pivotally mounted on shaft 136 journalled in brackets 138 mounted on the base of case 15. Slidably mounted on the cross piece of hammer 134, as by screws 140, are plural hammer pieces 142 each having a resilient striking platen 142a and a heavy base portion 142b. The cross piece of hammer 134 is slotted to receive screws 140 therethrough and permit limited upward movement of hammer pieces 142 in said slots. It is the upward movement of hammer pieces 142 that effects the printing operation. Affixed to hammer 134 is a limit plate 144 which extends beyond the hammer cross piece. This extension engages means hereinafter described to rotate hammer 134 counter-clockwise, as viewed in Fig. 2. A coil spring 146 interposed between limit plate 144 and a bracket 148 is tensioned upon counter-clockwise rotation of hammer 134 and upon release of pressure from hereinafter described means, spring 146 urges hammer 34 clockwise until limited by a stop 149 affixed to bracket 148. The hammer pieces 142, continue their travel and engage card 84 to press said card against ribbon 128 and print wheels 126. After striking the card, hammer pieces 142 gravitationally fall clear thereof, thereby permitting unrestricted removal of said card.

Means are provided to drive the aforesaid elements in timed relation to effect sensing, punching and printing operations in proper sequence.

To this end there is provided a main drive shaft 150 journalled in suitable bearings mounted in spaced bosses 152 formed integrally with base casting 22, Figs. 1, 2, 3, 12, 13 and 14. Drive shaft 150 has secured on one end thereof, a worm wheel 154 disposed in meshing engagement with a worm 156 secured to a stub shaft 158. Shaft 158 is journalled in bearing 160 secured in bosses 162 also integrally formed with base casting 22.

Figure 14:
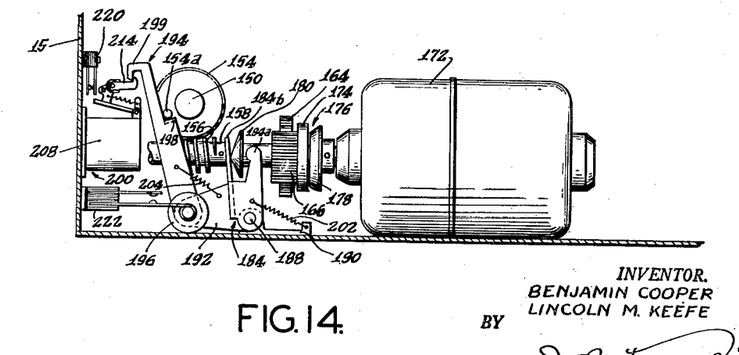
Fig. 14 is a side elevation taken along line 14—14 of Fig. 13.

Affixed to shaft 158 is a gear 164 disposed in meshing engagement with a pinion 166 secured on a sleeve journalled on shaft 170 of electric motor 172. Also affixed to sleeve 168 is the female disc 174 of a cone clutch 176. The male disc 178 of clutch 176 is affixed to shaft 170. Secured in the forward end of sleeve 168 is a control disc 180 having a diameter greater than said sleeve and having a peaked outer periphery. Control disc 180 is adapted to be moved toward and away from motor 172 on the shaft 170 and, accordingly, move clutch disc 176 into and out of engagement with driving clutch disc 178. Referring to Fig. 14, there is shown a control mechanism 182 that effectively provides control of clutch 176 to produce one complete revolution of shaft 150 with each actuation thereof. Control mechanism 182 comprises a channel shaped member 184 cut-away at one end to form arms 184a and an opposing plate 184b between which, control disc 180 is disposed. Channel member 184 is pivotally mounted, as by pin 188, on a bracket 190 affixed to the base of case 15. Forwardly extending from channel member 184 is an arm 192 and pivotally secured to the end thereof is a lever 194. Further, there is affixed to arm 192 a resilient shock absorber 196.

Lever 194 is formed with a transversely extending lip 198 adapted to engage a pin 154a secured to worm wheel 154 to prevent rotation of said wheel. Lever 194 is further provided with a hook 199 arranged to be engaged by clutch release solenoid mechanism 200 to move lever 194 counter-clockwise as viewed in Fig. 14, and displace lip 198 from engagement with pin 154a on worm wheel 154. A spring 202 interposed between member 184 and bracket 190 urges said member clockwise about pivot pin 188 raising arm 192 and lever 194 upwardly and simultaneously moving clutch disc 174 into engagement with driving clutch disc 178. Motor 172, energized by means hereinafter described, rotates shaft 158 through pinion 166 and gear 164, which in turn rotates drive shaft 150 through worm 156 and worm wheel 154. It will be noted that upward movement of lever 194 releases said lever from clutch release solenoid mechanism 200 and permits said lever to rotate clockwise to its initial position whereby pin 154a on worm wheel 154 will re-engage lip 198 after one-revolution of said wheel and move lever 194 downwardly. Arm 192 and member 184, accordingly disconnects clutch 176. It will be noted that a spring 204 interposed between lever 194 and arm 192 normally urges said lever clockwise. Further, the worm wheel arrangement prevents any retrograde movement of shaft 150, thereby assuring the repetitious stopping of said shaft in its correct initial angular position.

Figure 15:
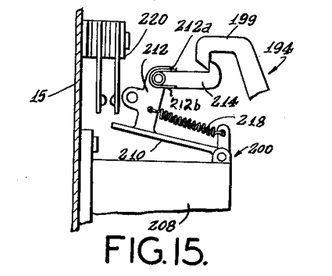
Fig. 15 is a fragmentary detail view of the clutch release mechanism.

Clutch release solenoid mechanism 200, Figs. 14 and 15, generally comprises an electro-magnetic solenoid 208 secured to the front wall of case 15. Armature 210 thereof is pivotally mounted to the solenoid frame and has upstanding therefrom an arm 212. Pivotally secured to arm 212 is a hook 214 complementally formed relative to hook 199 of lever 194. Arm 212 is further provided with a limit stop 212a which limits counter-clockwise rotation of hook 214 under the influence of torsion spring 216. Interposed between arm 212 and a raised extension of the frame of solenoid 208 is a spring 218 that normally urges armature 210 in a clockwise direction. Thus energization of solenoid 208 by means hereinafter described, attracts armature 210 moving said armature and elements thereon counter-clockwise to effect release of lever 194 from pin 154a. Armature 210, when rotated counter-clockwise effects the closing of a normally open switch 220 for a purpose hereinafter described.

Also it might be pointed out that clockwise rotation Fig. 14 of an arm 192 of the clutch mechanism effects closure of a normally open switch 222, for a purpose hereinafter apparent.

Referring to Figs. 3, 4, 5, 6, 8 and 8a, there is shown the means for actuating punching mechanism 12. Toward this end there is provided a toggle mechanism 230 comprising a transverse shaft 232 journalled in suitable bearings in cross plates 26 having a pair of arms 234 secured to each end thereof. Arm 234 is pivotally connected to a pair of links 236 which are each pivotally secured to vertical flanges 239 integrally formed from lower cage plate 34. Also pivotally secured to one of the arms 235 and links 236, is a link 238 which is pivotally connected at its other end to arm 240 affixed to shaft 242. Shaft 242 is journalled in a pair of brackets 244 secured, as by screws 246, to the punch supporting plate 40. Also secured to shaft 242 are a pair of spaced rearwardly extending arms 248 and pivotally secured to the ends thereof are the arms 250 of a reciprocating member 252. Member 252 is provided with an offset depending portion 252a having bifurcated tines 252b at its lower end. Also depending from the member 252 is a fixed arm 254 having a pin 256 secured therein. Pin 256 is also secured to the offset depending portion 252a and journalled on said pin and interposed between portion 252a and arm 254, is a roller 258. Roller 258 is disposed on the periphery of an eccentric cam 260 affixed to drive shaft 150. A concentric bushing 263 secured to shaft 150 adjacent cam 260 is disposed between the bifurcated tines 252b and guides member 252 in its reciprocating movement. It is readily apparent that rotation of cam 260 will urge member 252 upwardly to rotate arms 248 and shaft 242 counter-clockwise, as viewed in Figs. 3 and 6. Counter-clockwise rotation of shaft 242 moves arm 240 thereon in a similar direction which in turn moves link 238 leftwardly. Link 238 accordingly actuates toggle mechanism 230 to lower cage 30. The lowering of said cage causes pins 62 to sense the perforations in master card 78 as hereinbefore described.

After the high dwell of cam 260 passes under roller 258, a pair of springs 264 restore cage 30 to its initial uppermost position. Springs 264 are respectively interposed between the pivotal junction of toggle arms 234—236 and a stud 266 secured to a bracket 94.

Means are provided to move pin locking slides 80 to locking relation after those pins 62 finding apertures in master card 78 have moved downwardly a distance sufficient to clear pin protrusions 62d. Referring to Figs. 3, 4, 5, 6 and 7, each slide 80 has a pair of extending protrusions 80a and 80b on one end thereof. One end of a spring 270 is secured to each of the staggered protrusions 80a and the other end is secured to a flat arm 272 loosely journalled on shaft 242. Protrusion 80b of each slide 80 is arranged to abut against flat arm 272 when said arm and shaft 242 is disposed in normal or unactuated position.

Figure 16:
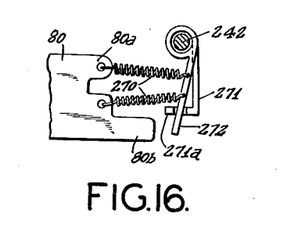
Fig. 16 is a fragmentary cross section of the pin locking slide controlling mechanism.

Thus, the tension of springs 270 is increased as arm 272 rotates counter-clockwise, Fig. 7 and slides 80 are urged rightwardly. An arm 271 affixed to shaft 242 has a slotted transverse extension 271a, the slot of which is relatively wider than the thickness of arm 272, which is positioned therein, Fig. 16. The slot in arm 271 enables cage 30 and pins 62 to descend whereby selected pin protrusions 62d are below slide 80, at which time the tension increases sufficiently to move said slides rightwardly.

The clockwise rotation of arms 271 and 272 resets slides 80 to their initial position. Those pins 62 that were locked down by slides 80 are restored upwardly by their respective springs 63 upon the slides moving leftward a sufficient amount to permit protrusions 64d to enter window openings 82b.

After cage 30 has moved downwardly and depressed pins 62 have been locked in position, die 50 is moved upwardly carrying the detail card 84 into engagement with those punches 48 that are held down either by pins 62 or pins 60. Card 84 is thereby perforated and upon downward movement of die 50, the card is stripped from the punches by plate 72 of detail card chamber 74. Die 50 is reciprocated by means of a pair of spaced eccentric cams 280 affixed to drive shaft 150. Referring to Figs. 3, 8, 8a and 9, each cam 280 is disposed for cooperation with a pair of rollers 282 carried by roller supports 284. Each of said supports is substantially C-shaped with rollers 282 journalled in between each end thereof. Support 284 is affixed as by screws 286, to the underside of die plate 58 in such a manner as to position each pair of rollers 282 above and below a respective cam 280. Thus, as cams 280 rotate in unison, rollers 282 through support 284 reciprocate die 50 to and from punching position, shown respectively in Figs. 9 and 6.

Figure 12:
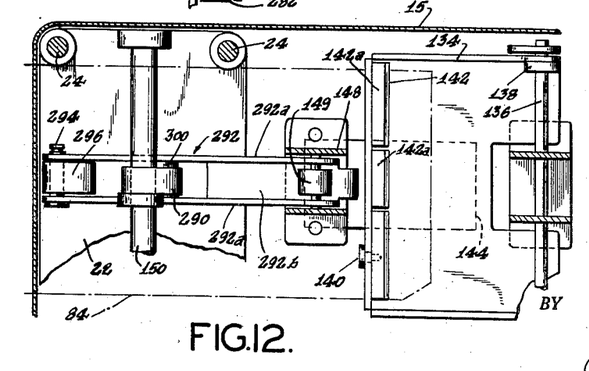
Fig. 12 is a fragmentary plan view of the printing hammer and related structure.

Print control means are provided to actuate printing hammer member 134 during each cycle of operation;

Figs. 1, 2, and 12. To this end there is provided an eccentric cam 290 affixed to drive shaft 150 and rotatable therewith. Adapted for cooperation with cam 290 is an arcuate hammer actuator 292, pivotally mounted at one end, as by pin 294, to a boss 296 of base casting 22. Actuator 292 generally comprises a pair of arcuate arms 292a joined by an interconnecting portion 292b and further having a pin 288 centrally supported therebetween. Journalled on pin 298 is a roller 300 adapted to be engaged by cam 290 to pivot said actuator clockwise, Fig. 2. As hammer 134 is depressed, spring 146 is tensioned to subsequently strike the printing blow as soon as cam 290 releases actuator 292.

Figure 20:
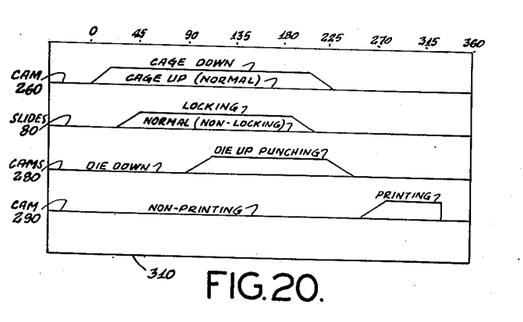
Fig. 20 is a timing chart of a punching operation.

Referring to Fig. 20, there is shown a timing chart 310 that graphically illustrates the timing relationship of the various elements in degrees of rotation of driven shaft 150. It will be seen that cage 30 is moved downward prior to slides 80 locking pins 62 in effective position. Subsequent to the locking of pins 62, die 50 is moved upwardly to effect punching of detail card 84. After said card has been punched, printing hammer 134 is actuated to print on detail card 84 prior to the completion of a revolution of drive shaft 150.

Figure 17:
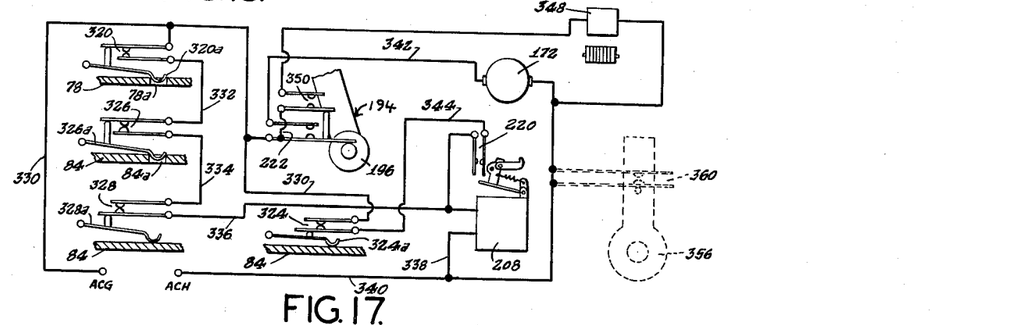
Fig. 17 is a schematic wiring diagram of the clutch and motor control circuits.
Figures 18, 19:
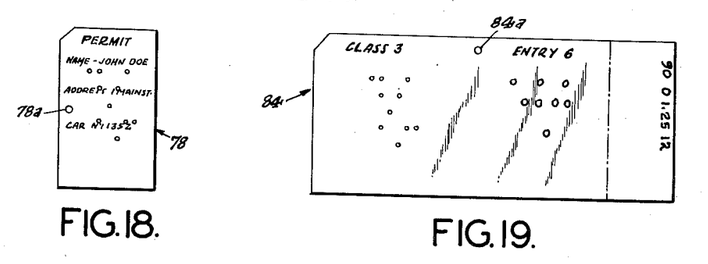
Fig. 18 is a plan view of a master card.
Fig. 19 is a plan view of a detail card.

Referring to Fig. 17, there is shown a schematic wiring diagram of the control circuit for clutch release solenoid mechanism 200 and motor 172. A normally closed micro-switch 320 is arranged to open upon insertion of a master card 78 in chamber 74 and remains open until said card is accurately positioned relative to sensing pins 62. Master card 78 is provided with a marginal control aperture 78a in which feeler 320a of switch 320 may enter. Switch 320 then closes and remains closed while card 78 is undisturbed. However, should the master card be displaced, said switch will open. There are three switches 324, 326 and 328 associated with the detail card chamber 52. Switch 324 is disposed in proximity to the entrance of chamber 52 and upon insertion of a card 84 therein, said switch closes.

Switch 326 is of the normally closed type and opens upon engagement of its feeler 326a with card 84. Margin control aperture 84a is adapted to receive feeler 326a therein and permit switch 326 to close. If detail card 84 is not properly positioned in chamber 52, then switch 326 cannot close.

Switch 328 is of the normally-open type and is adapted to close upon engagement of its feeler 328a with the leading edge of detail card 84. Switches 326 and 328 are disposed to be actuated concurrently by the leading edge of a card 84 as said card is inserted in its chamber.

As shown in Fig. 17 of the drawings, a conductor 330 leads from the ACG source of potential to one contact of switch 320. The other contact is connected by conductor 332 to one contact of switch 326. The other contact of switch 326 is connected to one contact of switch 328, by a conductor 334. Closure of switches 320, 326 and 328 completes a circuit to the coil of solenoid 208 which may be traced as follows: from ACG over conductor 330, through closed switch 320, over conductor 332, through closed switch 326, over conductor 334, through switch 328, over conductor 336 to one terminal of the coil of solenoid 208. The other terminal of said coil is connected by conductors 338, 340 to ACH to complete the circuit. Solenoid 208 energizes and releases clutch lever 194 which closes switch 222, to complete a circuit to motor 172. This circuit is as follows: from ACG over conductor 330 to switch 222, through said switch and over conductor 342 to one terminal of motor 172. The other terminal of motor 172 is connected by conductor 340 to ACH. Motor 172 continues to operate until lever 194 is restored to normal and switch 222 opens.

Solenoid 208 when energized completes a holding circuit therefor through switch 220 associated therewith. Switch 220 closes and completes a second circuit to solenoid 208 as follows: From ACG over conductor 330, through closed switch 324, over conductor 344, through closed switch 220 to one terminal of the coil of solenoid 208. The other terminal of said coil is connected by conductor 340 to ACH.

Thus, solenoid 208 remains energized after motor 172 is de-energized and clutch lever 194 has returned to normal position. Only when detail card 84 has been completely withdrawn from chamber 52 and switch 324 permitted to open will solenoid 208 de-energize. Hook 214 will then re-engage hook 199 and prepare the clutch release mechanism for a subsequent operation.

It is readily apparent that a repeat punching operation cannot occur unless card 84 is completely withdrawn from chamber 52 and reinserted in proper position.

Further, it will be noted that a detail card may be utilized without a master card being present in chamber 74 since switch 320 is normally closed. However, partial insertion of a master card in said chamber will open said switch and prevent energization of solenoid 208. The employment of levers 110 to set their associated punches to perforate a detail card without using a master card, requires that a blank master card be inserted within its chamber. Only the aperture 78a would be provided therein to close switch 320.

When employed in a toll checking system, the hereinbefore described device operates as follows:

A vehicle driver upon entering the toll facilities is handed a detail or toll rate card 84 which may or may not be preperforated with coded data representative of the issuing collector, entry interchange, vehicle classification, or other pertinent data. If not perforated therein, the detail card is printed with indicia identifying the point of entry, which is the issuing interchange. The vehicle driver surrenders the detail card at the exit interchange and the collector on duty ascertains the classification of the vehicle and the distance travelled from the indicated point of entry to the departing interchange. Upon determination of the toll to be collected, manually operative levers are set to the amount of toll along with other data, such as the collectors identification number, exit interchange number, etc. The detail card is then placed in chamber 52 and the preset information is codally punched in the card. At the same time a receipt may be printed by print wheels 126 for severance and return to the vehicle driver. The perforated portion of card 84 is then retained by the collector and forwarded to a central accounting for tabulation.

In the event that the vehicle driver is a holder of a permit or charge account identification card 78, he surrenders said card along with the detail card to the exit collector. The collector prepares the device in the manner hereinbefore described, and further inserts the master card 78 into its chamber 74 prior to the insertion of the detail card 84. Upon insertion of detail card 84 in chamber 52, the manually preset codal data is perforated therein along with the codal data pre-perforated in the master card. This pre-perforated data is representative of the permit or charge account identification. In the event of a charge transaction, the forwarded detail card is utilized by central accounting to bill the account holder for the recorded tolls. In the event of a permit transaction, the collector forwards the detail card after punching to central accounting as evidence of a free or permit transaction. Central accounting may tabulate the free or permit perforated detail cards to ascertain if the privileges connected therewith are being abused or used surreptitiously by the collector.

Figure 13:
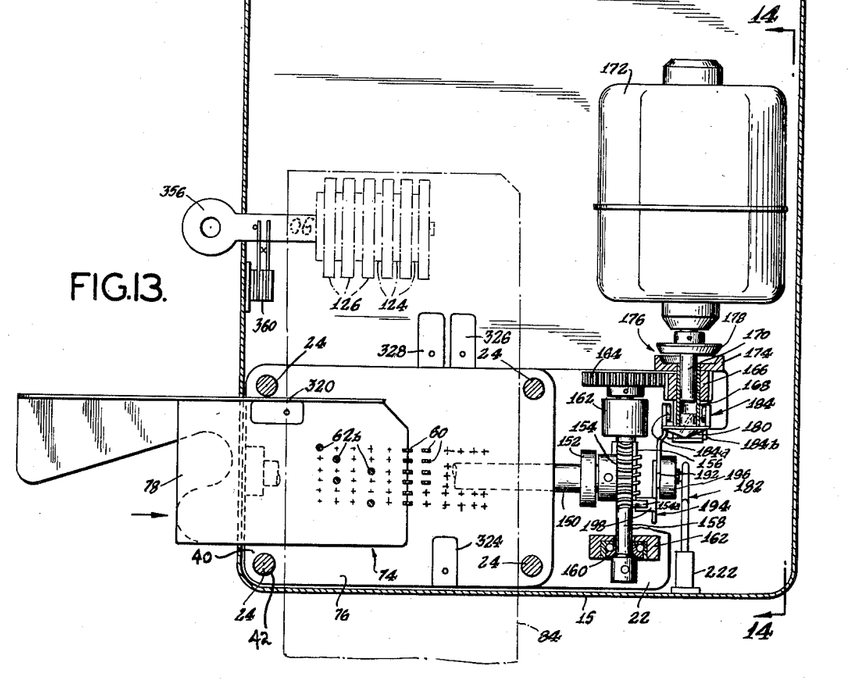
Fig. 13 is a plan view of the electric motive means and clutch associated therewith.

The device may be further provided with a transaction counter 348 as shown in block outline in Fig. 13, which accumulatively records the number of transactions and thereby provides a check on the collector. Such a counter is completely described in the Patent #2,293,934, issued August 25, 1942, to Cooper and need not be described in detail herein. Normally open contacts 350, Fig. 17, are closed each time lever 194 is actuated. Counter 348 is electro-magnetically operated and with each energization, one count is added thereon.

Further, a key 356 may be provided having raised indicia thereon that identifies the collector on duty. An appropriate slot is provided in case 15 for insertion of the key wherein the indicia thereon is positioned for printing on card 84. Also a control switch 360 may be operated by said key to disable the device if said identification key is not inserted.

In the event that switch 360 is employed, said switch is connected in the control circuit, Fig. 17, such as shown in dotted line, and conductor 340 is broken and connected to the contacts thereof.

It will thus be seen that there is provided a device in which the several objects of the invention are achieved and which is well adapted to meet the conditions of practical use.

As various embodiments may be made of the above inventions and as various changes might be made in the embodiments set forth, it is to be understood that all matters herein set forth or shown in the drawings are to be interpreted as illustrative and not in a limiting sense.

The invention claimed is:

1. In a machine for perforating cards by punching, in combination, a chamber adapted to receive a pre-perforated master card, sensing means for sensing the perforation pattern in the master card, switch means responsive to the manual alignment of the master card with said sensing means, a set of punches, means for causing said sensing means to select certain of said punches corresponding to the sensed sensing means, a second set of punches, manually operated means to select certain of said second set of punches, a second chamber adapted to receive a detail card, switch means responsive to the manual alignment of a detail card in said second chamber with both sets of punches, means to concurrently actuate the selected punches of said first and second sets of punches to perforate the detail card with perforations, means controlled by the insertion of the detail card in said detail card chamber to initiate the actuation of the punch actuating means, and means to prevent reactuation of said actuating means unless the detail card is withdrawn from its chamber to a predetermined extent and then reinserted therein to a predetermined extent.

2. In a machine for perforating cards by punching, in combination, a chamber adapted to receive a pre-perforated master card, switch means responsive to the manual alignment of a master card in said chamber, sensing means for sensing the perforation pattern in the master card, a set of punches, means for causing said sensing means to select certain of said punches corresponding to the master card perforation pattern, a second set of punches, manually operated means to select certain of said second set of punches, a second chamber adapted to receive a detail card, switch means responsive to the manual alignment of a detail card in said detail card chamber with both sets of punches, means to actuate the selected punches of said first and second sets of punches to perforate the detail card with perforations, means controlled by the insertion of the detail card in said detail card chamber to initiate the actuation of the punch actuating means, and means to enable said actuating means to actuate the selected punches in said second set of punches when the card in the master chamber is not perforated except with a card alignment control hole.

3. In a device of the character described, in combination, a reciprocable cage, a first set of pins carried by said cage, a master card chamber adapted to receive a master card therein for controlling said pins, switch means responsive to the manual alignment of a master card in said chamber, a second set of pins in said cage, manually settable means for selectively controlling certain of said second set of pins, a plurality of punches arranged for cooperation with both sets of pins, a reciprocable die having a detail card chamber therein, switch means responsive to the manual alignment of a detail card in said detail card chamber with said punches and means controlled by the alignment of both of the cards by the respective switch means to initiate actuation of said cage to sense a perforation pattern in the master card to control certain of said plurality of punches and to thereafter reciprocate said die to carry a detail card in the detail card chamber into engagement with those punches of said plurality of punches that are controlled by the selected pins in both sets of pins, to perforate the detail card.

4. In a device of the character described, in combination a chamber adapted to receive a master card therein, switch means responsive to the manual alignment of the master card in said chamber, said master card being provided with a plurality of perforations, reciprocable sensing means for sensing the perforations in the master card in said chamber, means to reciprocate said sensing means including a toggle mechanism, means to lock the sensing means in effective position controlled by said reciprocating means, a detail card chamber arranged to receive a detail card therein, switch means responsive to the manual alignment of a detail card in said detail card chamber, punching means controlled by the locked sensing means to perforate a detail card in said chamber with the pattern of perforations in the master card, and means controlled by the manual alignment of the respective cards with the respective switch means to initiate the actuation of said toggle means and said punching means in cyclic timed relation.

5. In a device of the character described, in combination, a chamber adapted to receive a master card therein, switch means responsive to the manual alignment of a master card in said chamber, said master card being provided with a plurality of perforations, reciprocable sensing means for sensing the perforations in the master card in said chamber, means to reciprocate said sensing means, means actuable by said reciprocating means to lock the sensing means in effective position, a detail card chamber arranged to receive a detail card therein, switch means responsive to the manual alignment of a detail card in said detail card chamber, a plurality of punches selectively controlled by the locked sensing means, means controlled by the manual alignment of the respective cards with the respective switch means to initiate the movement of the detail card chamber into and out of engagement with said punches to perforate the detail card in accordance with the selected punches that are controlled by the locked sensing means, and means to release the locked sensing means after the detail card chamber has moved out of engagement with said punches.

6. In a device of the character described, in combination, a master card chamber arranged to receive a pre-perforated master card therein, sensing means for sensing the perforations in said master card, switch means responsive to the manual alignment of the master card in the master card chamber with said sensing means, means to actuate said sensing means including a toggle mechanism, punching means including a set of punches controlled by the sensing means, a detail card chamber arranged to receive a detail card therein, switch means responsive to the manual alignment of a detail card in said detail card chamber with said punching means, and means controlled by the manual alignment of the respective cards with their respective switch means to initiate the reciprocation of said detail card chamber in timed relation with said toggle mechanism into and out of engagement with the punches controlled by said sensed sensing means to perforate the detail card.

7. In a device of the character described, in combination, a master card chamber arranged to receive a pre-perforated master card therein, sensing means for sensing the perforations in said master card, switch means responsive to the manual alignment of a master card in the master card chamber with said sensing means, means to actuate said sensing means, punching means including a set of punches controlled by the sensing means, a detail card chamber arranged to receive a detail card therein, switch means responsive to the manual alignment of a detail card in said detail card chamber with said punching means, means controlled by the manual alignment of the respective cards with their respective switch means to initiate the reciprocation of said detail card chamber into and out of engagement with the punches controlled by said sensed sensing means to perforate the detail card, printing means, hammer means to move the detail card into engagement with said printing means to effect a print, and common drive means to actuate said sensing means, said detail card chamber reciprocating means, and said hammer means in cyclicly timed relation.

8. In a device of the character described, in combination a master card chamber arranged to receive a pre-perforated master card therein, sensing means for sensing the perforations in said master card, switch means responsive to the manual alignment of a master card in said master card chamber with said sensing means, means to actuate said sensing means, punching means including a set of punches controlled by the sensing means, a detail card chamber arranged to receive a detail card therein, switch means responsive to the manual alignment of a detail card in said detail card chamber with said punching means, means to actuate the punching means including means to reciprocate said detail card chamber into and out of engagement with the punches controlled by said sensed sensing means to perforate the detail card, means controlled by the manual alignment of the respective cards with their respective switch means to initiate the actuation of said actuating means, printing means, hammer means to move the detail card into engagement with said printing means, to effect a print and said hammer means being actuated by said means for actuating the punching means.

9. In a detail card perforating machine, in combination, a master card chamber adapted to receive a master card therein, sensing means, switch means to position a master card in said chamber in register with said sensing means, a set of punches controllable by said sensing means, a detail card chamber, a second set of punches, switch means to position a detail card in said detail card chamber in register with both sets of punches, manually operable means, means controlled by said manually controlled operable means to selectively select certain of said second set of punches, means to actuate said sensing means to sense the master card and select certain of said first set of punches and to actuate the detail card chamber to carry the detail card into engagement with the selected punches in said first and second sets of punches to perforate the detail card, means controlled by the manual alignment of the respective cards with their respective switch means to initiate the actuation of said actuating means, said actuating means comprising a drive shaft, and means to rotate said shaft through a predetermined angle of rotation.

10. In a detail card perforating machine, in combination, a master card chamber adapted to receive a pre-perforated master card therein, sensing means including a reciprocable cage having a plurality of yieldable pins therein, switch means responsive to the manual positioning of a master card in said master card chamber in register with said yieldable pins, a set of punches controllable by said pins, a reciprocable die having a detail card chamber, switch means responsive to the manual positioning of a detail card in register with said set of punches, means to reciprocate said cage whereby the pins that enter the perforations in the master card effectively lock their associated punches against yielding movement, means to reciprocate said die to carry the detail card into engagement with those pins locked against yielding movement to perforate the detail card with a pattern corresponding to the perforation pattern in the master card, and means controlled by the manual alignment of the cards with their respective switch means to initiate the actuation of said cage and die reciprocating means.

11. In a detail card perforating machine, in combination, a master card chamber adapted to receive a pre-perforated master card therein, sensing means including a reciprocable cage having a plurality of yieldable pins therein, switch means responsive to the manual positioning of a master card in said master card chamber in register with said yieldable pins, a set of punches controllable by said pins, a reciprocable die having a detail card chamber, switch means responsive to the manual positioning of detail card in the detail card chamber in register with said set of punches, means to reciprocate said cage whereby the pins that enter the perforations in the master card effectively lock their associated punches against yielding movement, means to reciprocate said die to carry the detail card into engagement with those pins locked against yielding movement to perforate the detail card with a pattern corresponding to the perforation pattern in the master card, a second set of punches, manually operable means to select certain of said second set of punches whereby the detail card is perforated concurrently with the selected punches in said fisrt and second sets of punches, and means controlled by the manual alignment of the respective cards with their respective switch means to initiate the actuation of the cage and die reciprocating means.

12. In a detail card perforating machine, in combination, a master card chamber adapted to receive a pre-perforated master card therein, sensing means including a reciprocable cage having a plurality of yieldable pins therein, switch means to the manual positioning of a master card in said master card chamber in register with said yieldable pins, a set of punches controllable by said pins, a reciprocable die having a detail card chamber, switch means responsive to the manual positioning of the detail card in the detail card chamber in register with said set of punches, means to reciprocate said cage whereby the pins that enter the perforations in the master card effectively lock their associated punches against yielding movement, means to reciprocate said die to carry the detail card into engagement with those pins locked against yielding movement to perforate the detail card with a pattern corresponding to the perforation pattern in the master card, a second set of punches, manually operable means to select certain of said second set of punches whereby the detail card is perforated concurrently with the selected punches in said first and second sets of punches, means controlled by the manual alignment of the respective cards with their respective switch means to initiate the actuation of said cage and die reciprocating means, a plurality of printing wheels having indicia on the periphery thereof, said wheels being selectively settable to a printing position by said manually operable means concurrently with the selective setting of said second set of punches, a printing ribbon interposed between said wheels and the detail card, and hammer means controlled by said die reciprocating means to move the detail card into engagement with the ribbon and selected indicia on said printing wheels to reproduce the indicia on said detail card.

13. In combination, a master card chamber adapted to receive a pre-perforated master card therein, sensing means for sensing the perforations in said master card in said chamber, switch means responsive to the manual alignment of a master card in said chamber with said sensing means, a plurality of punches, a detail card chamber, switch means responsive to the manual alignment of a detail card in said detail card chamber with said punches, means for reciprocating said detail card chamber into engagement with said punches to perforate the detail card in accordance with the pre-perforated pattern in said master card, means controlled by the manual alignment of the respective cards with their respective switch means to initiate the actuation of said detail card chamber reciprocating means, and said controlling means including means to limit the reciprocation of said reciprocating means to a single cycle.

References Cited in the file of this patent

UNITED STATES PATENTS

| | | |
|---|---|---|
| Re. 21,133 | Lake | June 27, 1939 |
| 28,463 | Felt | May 29, 1860 |
| 1,100,986 | Power | June 23, 1914 |
| 1,317,458 | Powers | Sept. 30, 1919 |
| 1,430,014 | Hyman | Sept. 26, 1922 |
| 1,934,934 | Lorant | Nov. 14, 1933 |
| 1,944,671 | Schaaff | Jan. 23, 1934 |
| 1,986,352 | Moulton | Jan. 1, 1935 |
| 1,991,729 | Brougham | Feb. 19, 1935 |
| 2,050,745 | Woodruff | Aug. 11, 1936 |
| 2,110,854 | Fuller | Mar. 15, 1938 |
| 2,160,152 | Kelley | May 30, 1939 |
| 2,233,662 | Buster | Mar. 4, 1941 |
| 2,372,887 | Doty | Apr. 3, 1945 |
| 2,394,604 | Ford | Feb. 12, 1946 |
| 2,448,781 | Daly | Sept. 7, 1948 |
| 2,515,124 | Hilton | July 11, 1950 |
| 2,531,873 | Daly | Nov. 28, 1950 |
| 2,604,944 | Kelley | July 29, 1952 |
| 2,611,433 | Rembold | Sept. 23, 1952 |

FOREIGN PATENTS

| | | |
|---|---|---|
| 252,734 | Great Britain | June 9, 1927 |